(No Model.)

A. J. STEARNES.
MACHINE FOR STRAINING SOUPS, &c.

No. 506,746. Patented Oct. 17, 1893.

Witnesses:
R. J. Jacker.
Flora L. Brown.

Inventor:
Alfred J. Stearnes,
By Charles Turner Brown, Atty.

UNITED STATES PATENT OFFICE.

ALFRED J. STEARNES, OF CHICAGO, ILLINOIS.

MACHINE FOR STRAINING SOUPS, &c.

SPECIFICATION forming part of Letters Patent No. 506,746, dated October 17, 1893.

Application filed August 11, 1892. Serial No. 442,844. (No model.)

*To all whom it may concern:*

Be it known that I, ALFRED J. STEARNES, residing in the city of Chicago, county of Cook, and State of Illinois, have invented certain new and useful Improvements in Machines for Straining Soups, Purées, Sauces, and other Like Articles, of which the following, in connection with the drawings accompanying and forming a part hereof, is a full and complete description, sufficient to enable those skilled in the art to understand, make, and use the same.

My invention relates to machines used in the preparation of certain foods for the table, particularly in hotels, restaurants or houses, and the particular kind of food in the preparation of which the machine embodying my invention is utilized is soups, purées, sauces and the like.

The object of my invention is to obtain a machine which can be placed over any receptacle as a kettle, and which can have placed therein soups, purées, sauces and other like food preparations as the same are obtained in the cooking thereof, and through which such articles of food can be strained and thereby relieved from solid material.

Figure 1:
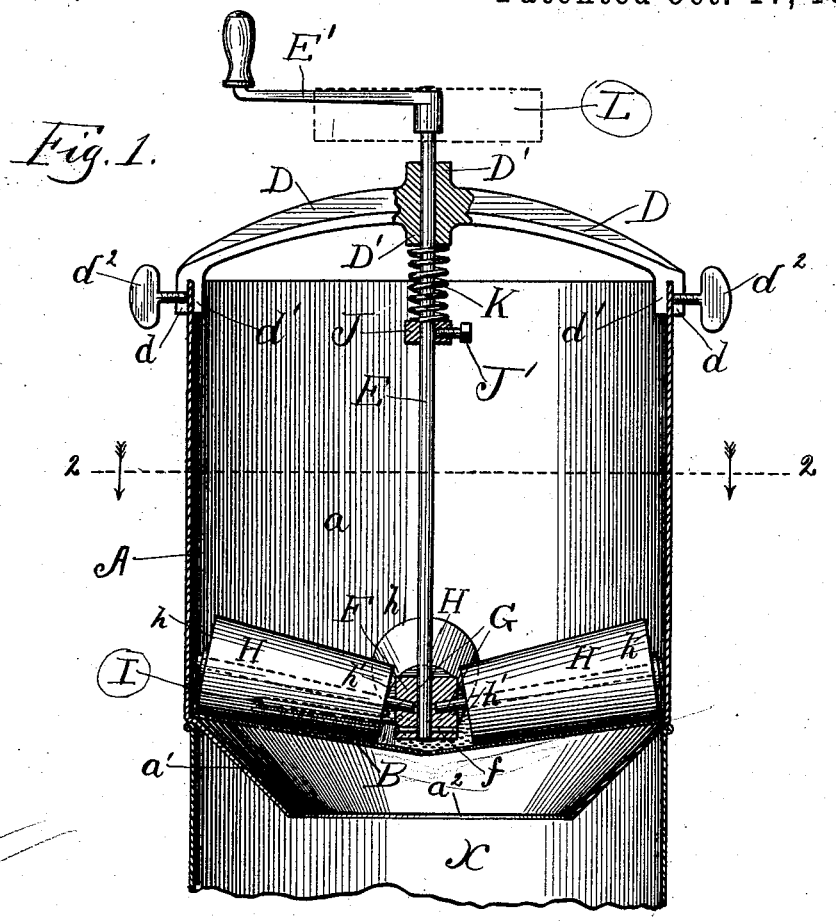
Figure 2:
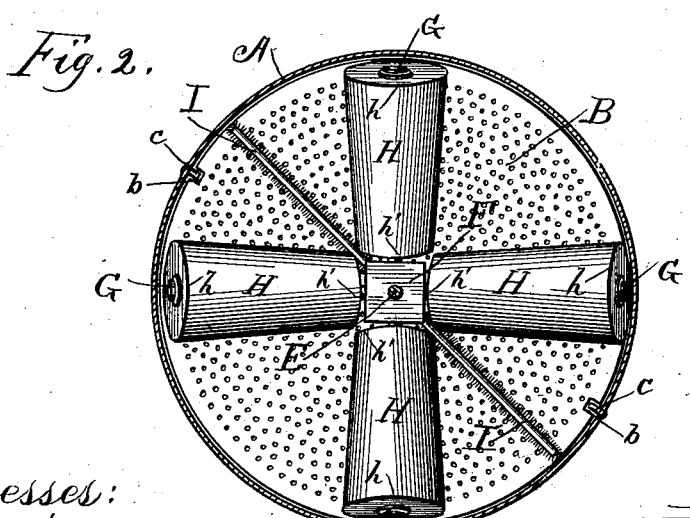

In the drawings illustrating my invention Figure 1, is a vertical sectional view of a machine embodying such invention and of the upper portion of a receptacle whereon such machine is placed; and Fig. 2, is a horizontal sectional view on line 2—2 of Fig. 1, viewed in the direction indicated by the arrows.

The same letter of reference is used to indicate a given part where more than one view thereof is shown in both the figures of the drawings.

X, is a kettle on which the machine embodying my invention is placed.

A, is the casing of my device consisting of the cylindrical side $a$ and the inclined bottom $a'$ having opening $a^2$ therein. The purpose of the inclined bottom $a'$ is to permit the placing in the receptacle formed by casing A, the soups, purées, sauces and the like to be strained thereby.

B, is a foraminated diaphragm fitting loosely in the cylindrical portion $a$ of the casing A so as to be readily removable therefrom when the several devices hereinafter described are taken from the casing A.

$b, b$, are notches in the edge of the foraminated diaphragm B; and C, C, are pins in casing A adapted to extend into the slots $b, b$, respectively. The purpose of the slots $b, b$, and pins C, C, is to prevent rotation of the foraminated diaphragm B in the operation of the machine. Casing A and foraminated diaphragm B form the receptacle into which the soup, purée, sauces and the like to be strained thereby are placed.

D, is an arm having journal bearing D' therein secured to the cylindrical casing A by lugs $d', d, d', d$ and thumb screws $d^2$, respectively.

E, is a vertical shaft journaled in bearings D' and having crank arm E' at the upper end thereof, or, if preferred, driving wheel L. (Indicated by dotted lines in Fig. 1.)

F, is a block rigidly secured to vertical shaft E at the lower end thereof, as by pin $f$ extending through a block F and through the vertical shaft E.

G, G, are rods rigidly secured in block F adapted to form shafts on which rollers H, H, H, respectively, are rotatably placed. The rollers H, H, are frusto-conical, being of larger diameter at the end $h$ thereof than at the end $h'$ thereof, the diameters $h, h'$, being, respectively, of suitable size so that as the vertical shaft E is rotated such rollers may rest on the foraminated diaphragm B, as they extend around the receptacle formed by the casing A, on such foraminated diaphragm B, and not slip or slide thereon. The foraminated diaphragm B, it will be observed, is lower at the center thereof than at the circumference, and in order to allow the portion of the periphery of the rollers H to touch such foraminated diaphragm upon the whole length of the under side of the periphery of such rollers, the rods D forming the shaft of the rollers H extend upward and outward from the block F. By this construction of the foraminated diaphragm with reference to the rollers H the lower end of the shaft E is in the operation of the device maintained in position with but one journal bearing thereof, to-wit: journal bearing D'.

I, I, are metal combs or brushes rigidly secured in block F in such manner that the lower end thereof will come in contact with the foraminated diaphragm B.

In order to maintain the rollers H and brushes I in contact with the foraminated diaphragm B with any desired pressure on such diaphragm, I place on shaft E the adjustable collar J having set screw J' therein, and spring K abutting at one end against the block J, and at the other end against journal bearing D'. The collar J is set to give the desired pressure of the rollers H on diaphragm B, and this pressure may vary with the different kinds of food products being strained through the machine.

In order to clean the device preparatory to using it, or after its having been used, the thumb screws $d^2$, $d^2$, are loosened, arm D, vertical shaft E, rollers H, H, H, and brushes I are raised out of the casing A. The foraminated diaphragm B can then be raised out of the casing and cleaned and returned thereto.

I have found in practice that certain kinds of food products require larger perforations than do others in the foraminated diaphragm B, and I prefer to furnish with each machine two or more diaphragms B having different sized perforations therein.

When the rollers H are removed from the casing A, as described, such rollers may be drawn off of the shafts G thereof and such shaft together with block F thoroughly cleaned, the rollers cleaned and placed back on the shaft and again put into the casing A in contact with the foraminated diaphragm B required for the food product to be strained, and arm D again secured in place by the thumb screws $d^2$, $d^2$.

The operation of the device can be readily understood to consist in first placing the casing A over a suitable receptacle X, then pouring the food product to be strained into the receptacle formed by the casing A and diaphragm B and revolving the vertical shaft E, by means of the crank arm E' thereof or by pulley L, in this manner turning shafts G, G, around in casing A. Rollers H, H, turning around in the casing A on shafts G, G, respectively, will be removed on such shafts G, G, thereby pressing through the foraminations in the diaphragm B the liquid contained in any material over which the rollers pass. The combs or brushes I, I, will also turn around in casing A, in contact with the foraminated diaphragm B, and will tend to brush up from the foraminated diaphragm material pressed upon it of too great consistency to pass through the foraminations therein. As will be seen by the dotted lines in Fig. 1, the combs or brushes I extend a comparatively short distance above the foraminated diaphragm B, and hence, after being cleaned from the diaphragm such material will, when sufficient thereof is contained in the casing A, extend over the top of the combs or brushes I, I, respectively, and again come in contact with the foraminated diaphragm B to be again pressed against the diaphragm and have the liquid held or contained therein pressed therefrom through the foraminations in such diaphragm. I have found in practice, that by this arrangement soups, purées, and sauces can be quickly and effectually strained and will present a very uniform consistency, after having been passed through the machine.

It is evident that the block F is employed in order to enable me to use a shaft E of lesser diameter than would be required were the shafts G extended into such vertical shaft, and, if preferred, such block F can be integral with the shaft B, or keyed thereto, or shaft B may be made of sufficient diameter to allow the shafts G, G, and combs I, I, to extend into and be secured in such vertical shaft E.

Having thus described my invention, what I claim as new, and desire to secure by Letters Patent, is—

1. In a machine for straining food products, the combination of a casing, a foraminated diaphragm removably contained in such casing, an arm extending across the top of the casing and removably secured thereto, a vertical shaft rotatably journaled in such arms, means for actuating such shaft at the upper end thereof, rods forming shafts extending outward and upward from the vertical shaft at the lower end thereof, cone-shaped rollers rotatably placed on such shafts, respectively, and combs secured to such vertical shaft; such frusto-conical rollers and combs being adapted to come in contact with the foraminated diaphragm in the rotation of the vertical shaft; substantially as described.

2. In a machine for straining food products the combination of a casing, a foraminated diaphragm removably contained in such casing, an arm extending across the top of the casing and removably secured thereto, a vertical shaft rotatably journaled in such arm, means for actuating such shaft secured to the upper end thereof, rods forming shafts extending outward and upward from such vertical shaft at the lower end thereof, frusto-conical rollers rotatably placed on such shafts, respectively, brushes secured to such shaft, an adjustable collar placed on the vertical shaft, and a spring placed on such shaft, one end of such spring abutting in the journal bearing of the shaft, and the other end thereof abutting against such adjustable collar, whereby the vertical shaft together with the rollers and combs thereon may be adjusted to come in contact with the foraminated diaphragm with desired force in the rotation thereof around the receptacle formed by the casing; substantially as described.

ALFRED J. STEARNES.

In presence of—
A. J. ROBERTSON,
CHARLES TURNER BROWN.